Figure 3:
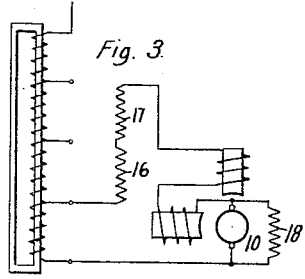
Figure 4:
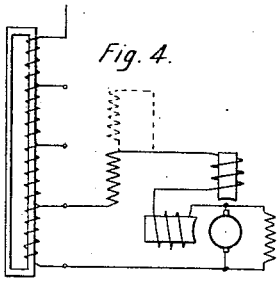
Figure 5:
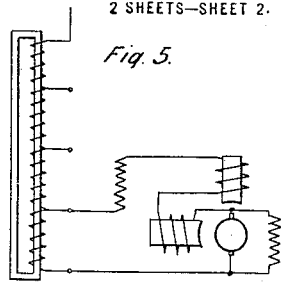
Figure 6:
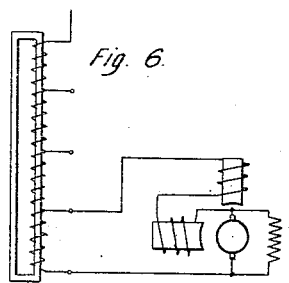
Figure 7:
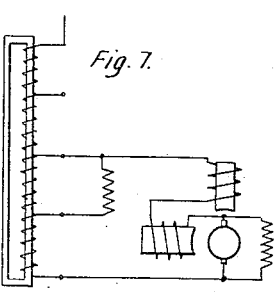

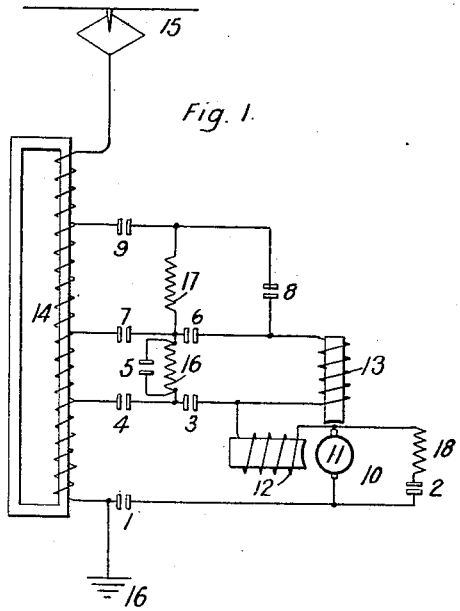

J. V. DOBSON.
SYSTEM OF CONTROL.
APPLICATION FILED JULY 22, 1915.

1,285,070.

Patented Nov. 19, 1918.
2 SHEETS—SHEET 2.

WITNESSES:
Fred H Miller
D C Davis

INVENTOR
John V. Dobson
BY
Wesley G Carr
ATTORNEY

UNITED STATES PATENT OFFICE.

JOHN V. DOBSON, OF WILKINSBURG, PENNSYLVANIA, ASSIGNOR TO WESTINGHOUSE ELECTRIC AND MANUFACTURING COMPANY, A CORPORATION OF PENNSYLVANIA.

SYSTEM OF CONTROL.

1,285,070.   Specification of Letters Patent.   Patented Nov. 19, 1918.

Application filed July 22, 1915.   Serial No. 41,261.

*To all whom it may concern:*

Be it known that I, JOHN V. DOBSON, a citizen of the United States, and a resident of Wilkinsburg, in the county of Allegheny and State of Pennsylvania, have invented a new and useful Improvement in Systems of Control, of which the following is a specification.

My invention relates to systems of control to be employed in connection with alternating-current motors of the compensated commutator type, and it has for its object to provide means whereby the speed of apparatus of the character described may be controlled in a simple and effective manner by the use of but few switches and preventive devices.

Referring to the accompanying drawings, Figure 1 is a diagrammatic view of a compensated commutator motor together with its attendant supply and control circuits; Fig. 2 is a sequence chart illustrating the method of switch operation in the circuit of Fig. 1; and Figs. 3 to 15, inclusive, are diagrammatic views setting forth, in detail, the operation of my system of control.

According to my invention, I start a compensated commutator motor with a closed circuit around the armature in order that the well-known advantages of the repulsion motor, in giving good commutation and torque at low speeds, may be obtained. Resistance members are also connected in series with the motor windings at the start in order to cut down the current and to give a smooth start. As the motor is brought up to speed, said resistance members are employed as preventive devices in raising the voltage applied to the motor. An intermediate connection is then established, and the circuit in shunt to the armature is opened so that the general method of operation is changed from that of a repulsion motor to that of a doubly-fed motor. The same resistance members are next connected as preventive devices to still further raise the voltage applied to the motor. They are then employed in shunt to the cross field winding to provide for a proper commutating field at the corresponding speed and are finally entirely eliminated from the circuit, and the motor is connected directly to the source for normal doubly-fed operation.

Referring now to Fig. 1 for a more detailed understanding of my invention, I show a compensated commutator motor at 10 comprising an armature 11, a main field winding 12 and a cross field winding 13. Energy for the operation of the motor 10 may be derived from any suitable source, such, for example, as an auto-transformer 14, connected between a trolley wire 15 and the ground, at 16, as is the common practice on railway vehicles. Suitable switches 1 to 9, inclusive, and resistance members 16, 17 and 18 are associated with the motor 10 for the proper control and excitation thereof.

Figure 8:
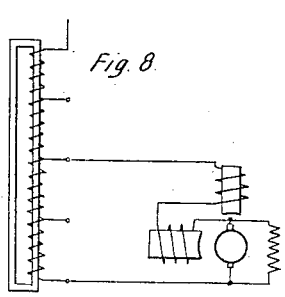
Figure 9:
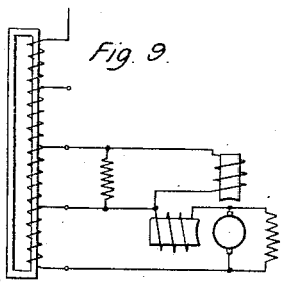
Figure 10:
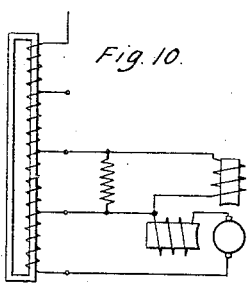
Figure 11:
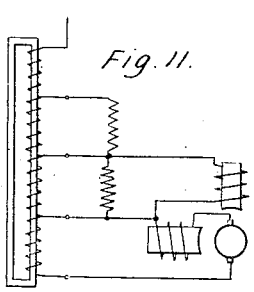
Figure 12:
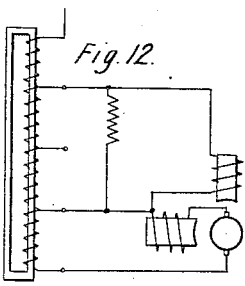
Figure 13:
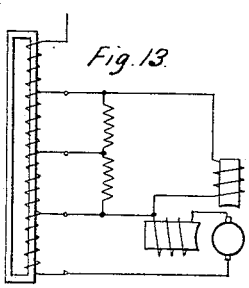
Figure 14:
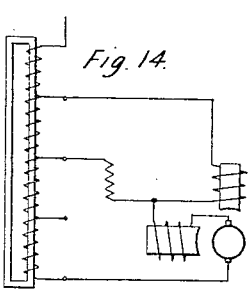
Figure 15:
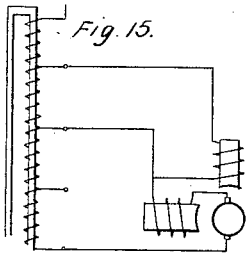

At the outset, with the connections as indicated at A in Fig. 2 and in Fig. 3, the switches 1, 2, 4 and 8 are closed and the motor 10 is connected for repulsion operation, with the resistance member 18 in shunt to the armature and with the resistance members 16 and 17 in series with the windings thereof. With speeds B, C and D, illustrated in Figs. 4, 5 and 6, the resistance members 16 and 17 are eliminated from the circuit, and the motor 10 is finally connected for repulsion operation on the first transformer tap. The resistance member 16 is then employed as a preventive device in raising the voltage applied to the motor to that of the second transformer tap so that repulsion operation is obtained at the accelerating position F, as shown in Fig. 8. At the accelerating position G, shown in Fig. 9, preparation is made for doubly-fed operation by reconnecting the first transformer tap to a point in the circuit between the main and cross field windings. In the accelerating position H, shown in Fig. 10, the resistance member 18 is disconnected, and the transition is made from repulsion to doubly-fed operation. In the accelerating position I, shown in Fig. 11, the resistance member 17 is employed as a preventive device in raising the voltage applied to the cross field winding 13, and, in the succeeding position, said resistance member 17 is connected in shunt to the cross field winding to provide the proper intermediate value of the commutating field. The commutating field is then further strengthened by increasing the resistance of its shunt path through the insertion of the resistance member 16 in series with the resistance member 17. In the accelerating position L, shown in Fig. 14, the resistance member 17 is eliminated and the voltage applied to the cross field winding 13 is reduced only by the resistance member 16 operating in the intermediate connection. In the final operating position M, shown in Fig. 15, maximum voltage is applied to the motor for straight doubly-fed operation.

It will be observed that I have obtained a large number of running speeds with appropriate intermediate accelerating notches by the use of but nine switches, three transformer taps and three resistance members, thus providing a light and inexpensive control equipment.

Throughout this description I have disclosed motor operation but, by appropriate minor changes, my system of control is equally applicable to the gradual increase in the voltage supplied by a machine of the character described during regenerative operation.

I claim as my invention:

1. The method of operating an alternating-current motor of the commutator type, provided with a compensating field winding, in conjunction with a source of alternating current and two resistors which comprises, at first, employing both of said resistors in series relation to the windings of said motor, subsequently employing one of said resistors as a preventive device in adjusting the voltage applied to said motor, and employing the other of said resistors as a preventive device in adjusting the voltage applied to said motor and, finally employing both of said resistors in parallel relation to the compensating-field winding of said motor.

2. The method of operating an alternating-current motor of the commutator type, provided with a commutating-field winding and arranged for either repulsion or doubly-fed operation, in conjunction with a source of alternating current and two resistors, which comprises, at first, when said motors are arranged for repulsion operation, employing both of said resistors in series relation therewith, and then employing one of said resistors as a preventive device in adjusting the voltage supplied to said motor and, subsequently when said motor is arranged for doubly-fed operation, employing the other of said resistors as a preventive device in adjusting the voltage supplied to said motor and then employing both of said resistors in parallel relation to the compensating field winding of said motor.

In testimony whereof, I have hereunto subscribed my name this 19th day of July, 1915.

JOHN V. DOBSON.

Copies of this patent may be obtained for five cents each, by addressing the "Commissioner of Patents, Washington, D. C."